(12) United States Patent
Sano et al.

(10) Patent No.: US 11,302,357 B2
(45) Date of Patent: Apr. 12, 2022

(54) MAGNETIC RECORDING MEDIUM HAVING CHARACTERIZED BACK COAT AND MAGNETIC RECORDING AND REPRODUCING APPARATUS

(71) Applicant: FUJIFILM Corporation, Tokyo (JP)

(72) Inventors: Naoki Sano, Minami-ashigara (JP); Takuto Kurokawa, Minami-ashigara (JP); Eiki Ozawa, Minami-ashigara (JP); Norihito Kasada, Minami-ashigara (JP); Megumi Nakano, Minami-ashigara (JP)

(73) Assignee: FUJIFILM Corporation, Tokyo (JP)

(*) Notice: Subject to any disclaimer, the term of this patent is extended or adjusted under 35 U.S.C. 154(b) by 36 days.

(21) Appl. No.: 17/025,092

(22) Filed: Sep. 18, 2020

(65) Prior Publication Data
US 2021/0090602 A1 Mar. 25, 2021

(30) Foreign Application Priority Data
Sep. 19, 2019 (JP) .............................. JP2019-170508

(51) Int. Cl.
G11B 5/78 (2006.01)
G11B 5/733 (2006.01)
G11B 5/735 (2006.01)
G11B 5/706 (2006.01)

(52) U.S. Cl.
CPC ............ *G11B 5/78* (2013.01); *G11B 5/70678* (2013.01); *G11B 5/733* (2013.01); *G11B 5/7356* (2019.05)

(58) Field of Classification Search
None
See application file for complete search history.

(56) References Cited

U.S. PATENT DOCUMENTS

| 10,679,657 | B2 * | 6/2020 | Kurokawa | G11B 5/127 |
| 11,189,318 | B2 * | 11/2021 | Kasada | G01B 9/02 |
| 2005/0053804 | A1 | 3/2005 | Kato | |
| 2011/0274947 | A1 | 11/2011 | Ishiguro et al. | |
| 2019/0304488 | A1 * | 10/2019 | Ozawa | G11B 5/70 |
| 2020/0365178 | A1 * | 11/2020 | Kasada | G11B 5/70678 |
| 2021/0090600 | A1 * | 3/2021 | Kurokawa | G11B 5/7356 |

FOREIGN PATENT DOCUMENTS

| JP | 2005-085305 A | 3/2005 |
| JP | 2011-187129 A | 9/2011 |

* cited by examiner

*Primary Examiner* — Kevin M Bernatz
(74) *Attorney, Agent, or Firm* — Sughrue Mion, PLLC

(57) ABSTRACT

The magnetic recording medium includes: a non-magnetic support; a magnetic layer that includes ferromagnetic powder on one surface side of the non-magnetic support; and a back coating layer that includes non-magnetic powder on the other surface side of the non-magnetic support, in which a difference between a spacing measured on a surface of the back coating layer by optical interferometry under a pressure of 0.5 atm after n-hexane cleaning and a spacing measured on the surface of the back coating layer by optical interferometry under a pressure of 13.5 atm after n-hexane cleaning is 12 nm or more.

19 Claims, No Drawings

MAGNETIC RECORDING MEDIUM HAVING CHARACTERIZED BACK COAT AND MAGNETIC RECORDING AND REPRODUCING APPARATUS

CROSS-REFERENCE TO RELATED APPLICATIONS

This application claims priority under 35 U.S.C 119 to Japanese Patent Application No. 2019-170508 filed on Sep. 19, 2019. The above application is hereby expressly incorporated by reference, in its entirety, into the present application.

BACKGROUND OF THE INVENTION

1. Field of the Invention

The present invention relates to a magnetic recording medium and a magnetic recording and reproducing apparatus.

2. Description of the Related Art

In recent years, for a magnetic recording medium, a back coating layer is provided on a surface side of a non-magnetic support opposite to a surface side provided with a magnetic layer (see JP2005-085305A and JP2011-187129A).

SUMMARY OF THE INVENTION

In a magnetic recording medium having a back coating layer, a transfer of a shape of irregularities on a surface of the back coating layer to a magnetic layer (also referred to as "reverse transfer".) may cause performance degradation (for example, see paragraph 0004 of JP2005-085305A and paragraph 0004 of JP2011-187129A). An example of performance degradation due to reverse transfer is occurrence of dropout (signal reading failure). Since occurrence of dropout increases an error rate, it is desirable to suppress occurrence of dropout.

An aspect of the present invention provides for a magnetic recording medium including a back coating layer, in which occurrence of dropout is suppressed.

An aspect of the present invention relates to a magnetic recording medium comprising: a non-magnetic support; a magnetic layer that includes ferromagnetic powder on one surface side of the non-magnetic support; and a back coating layer that includes non-magnetic powder on the other surface side of the non-magnetic support, in which a difference $(S_{0.5}-S_{13.5})$ between a spacing $S_{0.5}$ measured on a surface of the back coating layer by optical interferometry under a pressure of 0.5 atm after n-hexane cleaning and a spacing $S_{13.5}$ measured on the surface of the back coating layer by optical interferometry under a pressure of 13.5 atm after n-hexane cleaning is 12 nm or more. Hereinafter, the difference $(S_{0.5}-S_{13.5})$ will be simply referred to as a "difference". In addition, 1 atm=101325 Pa (Pascal).

In an embodiment, the difference may be 12 nm or more and 50 nm or less.

In an embodiment, the difference may be 12 nm or more and 40 nm or less.

In an embodiment, $S_{0.5}$ may be 20 nm or more and 90 nm or less.

In an embodiment, $S_{13.5}$ may be 15 nm or more and 40 nm or less.

In an embodiment, $S_{13.5}$ may be 15 nm or more and 29 nm or less.

In an embodiment, the back coating layer may include an organic resin particle.

In an embodiment, the back coating layer may include a compound containing an alkyl group having 5 or more carbon atoms.

In an embodiment, the compound may be an organic amine compound.

In an embodiment, the compound may be an organic phosphorus compound.

In an embodiment, the back coating layer may have a thickness of 0.5 µm or less.

In an embodiment, the magnetic recording medium may further comprise a non-magnetic layer including non-magnetic powder between the non-magnetic support and the magnetic layer.

In an embodiment, the magnetic recording medium may be a magnetic tape.

Another aspect of the present invention relates to a magnetic recording and reproducing apparatus comprising: the magnetic recording medium described above; and a magnetic head.

According to an aspect of the present invention, it is possible to provide a magnetic recording medium including a back coating layer, in which occurrence of dropout is suppressed. According to an aspect of the present invention, it is possible to provide a magnetic recording and reproducing apparatus including such a magnetic recording medium.

DESCRIPTION OF THE PREFERRED EMBODIMENTS

Magnetic Recording Medium

An aspect of the present invention relates to a magnetic recording medium comprising: a non-magnetic support; a magnetic layer that includes ferromagnetic powder on one surface side of the non-magnetic support; and a back coating layer that includes non-magnetic powder on the other surface side of the non-magnetic support, in which a difference $(S_{0.5}-S_{13.5})$ between a spacing $S_{0.5}$ measured on a surface of the back coating layer by optical interferometry under a pressure of 0.5 atm after n-hexane cleaning and a spacing $S_{13.5}$ measured on the surface of the back coating layer by optical interferometry under a pressure of 13.5 atm after n-hexane cleaning is 12 nm or more.

In the present invention and this specification, "n-hexane cleaning" means that a sample piece cut out from a magnetic recording medium is immersed in fresh n-hexane (200 g) at a liquid temperature of 20° C. to 25° C. and ultrasonically cleaned for 100 seconds (ultrasonic output: 40 kHz). In a case where a magnetic recording medium to be cleaned is a magnetic tape, a sample piece having a length of 5 cm is cut out and subjected to n-hexane cleaning. A width of the magnetic tape and a width of the sample piece cut from the magnetic tape are usually ½ inches. 1 inch=0.0254 meters. For also magnetic tapes other than that having ½ inches width, a sample piece having a length of 5 cm may be cut out and subjected to n-hexane cleaning. In a case where a magnetic recording medium to be cleaned is a magnetic disk, a sample piece having a size of 5 cm×1.27 cm is cut out and subjected to n-hexane cleaning. A measurement of a spacing which will be described in detail below is performed after a sample piece after n-hexane cleaning is left under an environment of a temperature of 23° C. and a relative humidity of 50% for 24 hours.

In the present invention and this specification, the "back coating layer surface (surface of the back coating layer)" of the magnetic recording medium has the same meaning as a surface of the magnetic recording medium on a back coating layer side.

In the present invention and this specification, a spacing measured on the back coating layer surface of the magnetic recording medium by optical interferometry is a value measured by the following method.

In a state where the magnetic recording medium (specifically, the above sample piece. The same applies hereinafter.) and a transparent plate member (for example, a glass plate or the like) are superposed such that the back coating layer surface of the magnetic recording medium faces the transparent plate member, a pressing member is pressed at a pressure of 0.5 atm or 13.5 atm from a side of the magnetic recording medium opposite to a side of the back coating layer. In this state, the back coating layer of the magnetic recording medium is irradiated with light through the transparent plate member (irradiation region: 150,000 to 200,000 $\mu m^2$), and a spacing (distance) between the back coating layer surface of the magnetic recording medium and a surface of the transparent plate member on the magnetic recording medium side is obtained based on an intensity (for example, a contrast of an interference fringe image) of interference light generated by an optical path difference between reflected light from the back coating layer surface of the magnetic recording medium and reflected light from the surface of the transparent plate member on the magnetic recording medium side. Here, emitted light is not particularly limited. In a case where emitted light is light having a light emission wavelength over a relatively wide wavelength range, such as white light having light with a plurality of wavelengths, a member, such as an interference filter, which has a function of selectively cutting light with a specific wavelength or light out of a specific wavelength region is disposed between the transparent plate member and a light receiving section that receives reflected light, and light of some wavelengths or light in some wavelength regions in reflected light is selectively incident on the light receiving section. In a case where emitted light is light having a single emission peak (so-called monochromatic light), the member may not be used. As an example, a wavelength of light incident on the light receiving section can be in a range of 500 to 700 nm, for example. However, a wavelength of light incident on the light receiving section is not limited to the above range. Moreover, the transparent plate member may be a member having transparency which allows emitted light to pass therethrough to such an extent that the interference light can be obtained by irradiating the magnetic recording medium with light through this member.

An interference fringe image obtained by the above spacing measurement is divided into 300,000 points to obtain a spacing of each point (a distance between the back coating layer surface of the magnetic recording medium and the surface of the transparent plate member on the magnetic recording medium side), and thus this is used as a histogram and a mode value in the histogram is used as a spacing.

Five sample pieces are cut out from the same magnetic recording medium, and after n-hexane cleaning for each sample piece, a pressing member is pressed at a pressure of 0.5 atm to obtain a spacing, and further, a pressing member is pressed at a pressure of 13.5 atm to obtain a spacing. Then, an arithmetic average of the spacings obtained under a pressure of 0.5 atm after n-hexane cleaning for the five sample pieces is defined as a spacing $S_{0.5}$, and an arithmetic average of the spacings obtained under a pressure of 13.5 atm after n-hexane cleaning for the five sample pieces is defined as a spacing $S_{13.5}$. A difference ($S_{0.5}-S_{13.5}$) between $S_{0.5}$ and $S_{13.5}$ thus obtained is defined as a difference ($S_{0.5}-S_{13.5}$) for the magnetic recording medium.

The above measurement can be performed using, for example, a commercially available tape spacing analyzer (tape spacing analyzer; TSA) such as tape spacing analyzer manufactured by Micro Physics. Spacing measurement in Examples was performed using a tape spacing analyzer manufactured by Micro Physics.

In the magnetic recording medium, a difference ($S_{0.5}-S_{13.5}$) between a spacing $S_{0.5}$ measured under a pressure of 0.5 atm and a spacing $S_{13.5}$ measured under a pressure of 13.5 atm on the surface of the back coating layer by optical interferometry after n-hexane cleaning is 12 nm or more. Therefore, according to the magnetic recording medium described above, occurrence of dropout can be suppressed. Supposition of the present inventor regarding this point is as follows.

The cause of dropout is that a shape of irregularities on the surface of the back coating layer is transferred to the magnetic layer (reverse transfer). As disclosed in, for example, paragraph 0004 of JP2005-085305A and paragraph 0004 of JP2011-187129A, reverse transfer can be obtained may occur in a case where the back coating layer comes into contact with the magnetic layer in a form in which the magnetic recording medium is wound into a roll shape during manufacture, storage, or the like of the magnetic recording medium. In a case where the back coating layer comes into contact with the magnetic layer, a portion that mainly comes into contact with a magnetic layer surface is considered to be a protrusion existing on the back coating layer surface. In the course of repeated studies, the present inventor considered that, during manufacture or storage of the magnetic recording medium, a pressure is applied to the back coating layer surface by the contact with the magnetic layer in the process of winding the magnetic recording medium into a roll shape, and further, winding tightness occurs after the winding and a higher pressure is applied to the back coating layer surface. Therefore, the present inventor considered that a protrusion on the back coating layer surface strongly presses the magnetic layer surface, thereby greatly deforming the magnetic layer surface in a state where a higher pressure is applied, and supposed that suppression of reverse transfer in the state contributes to suppression of occurrence of dropout. Neither JP2005-085305A nor JP2011-187129A suggests that attention should be paid to the state of the back coating layer surface in a case where such a high pressure is applied. With respect to this, the present inventor, based on the above-described knowledge, supposed that it is possible to suppress occurrence of dropout by making a protrusion on the back coating layer surface easily sink into the back coating layer in a case where a higher pressure is applied, and made further intensive studies. As a result, it was newly found that it is possible to suppress occurrence of dropout by setting the difference ($S_{0.5}-S_{13.5}$) measured on the back coating layer surface to 12 nm or more. It is considered that the large difference ($S_{0.5}-S_{13.5}$) of 12 nm or more indicates that a protrusion on the back coating layer surface easily sinks into the back coating layer in a case where a high pressure is applied as described above. However, the present invention is not limited to the above supposition. In addition, the present invention is not limited to another supposition of the present inventor described in this specification. For pressures of 13.5 atm and 0.5 atm during pressing in measurement of spacings for obtaining the above difference, in the present invention, 13.5 atm is adopted as an exemplary value that can correspond to a state where a higher pressure is applied to the back coating layer surface as described above, and 0.5 atm is adopted as an exemplary value of a pressure that can be applied to the back coating layer surface in a case of contacting with the magnetic layer surface in another state. A pressure that can be applied to the magnetic recording medium during manufacture, storage, or the like of the magnetic recording medium is not limited to these pressures.

Hereinafter, the magnetic recording medium will be described more specifically.

Difference ($S_{0.5}-S_{13.5}$)

The difference ($S_{0.5}-S_{13.5}$) measured on the back coating layer surface of the magnetic recording medium is 12 nm or more, and from a viewpoint of further suppressing occurrence of dropout, is preferably 13 nm or more, and more preferably 14 nm or more. In addition, from a viewpoint of improving running stability under a high temperature and a high humidity, which will be described in detail later, the difference is preferably, for example, 50 nm or less, more preferably 45 nm or less, still more preferably 40 nm or less, still more preferably 35 nm or less, still more preferably 30 nm or less, still more preferably 28 nm or less, and still more preferably 25 nm or less.

$S_{0.5}$ and $S_{13.5}$ are not particularly limited as long as the difference is 12 nm or more. For $S_{0.5}$, the present inventor considers that controlling of $S_{0.5}$ in the magnetic recording medium in which the difference is 12 nm or more leads to improvement in running stability of the magnetic recording medium under a high temperature and a high humidity. This is because it is considered that a pressure of 0.5 atm during measurement of $S_{0.5}$ is a pressure that can exemplify a pressure mainly applied to a protrusion on the back coating layer surface in a case of contacting with a constituent member (for example, a reel or the like) of a magnetic recording and reproducing apparatus during running under a high temperature and a high humidity. From a viewpoint of improving running stability under a high temperature and a high humidity, $S_{0.5}$ is preferably 20 nm or more, more preferably 30 nm or more, still more preferably 40 nm or more, still more preferably 45 nm or more, and still more preferably 46 nm or more. In addition, from the same viewpoint, $S_{0.5}$ is preferably 90 nm or less, more preferably 80 nm or less, still more preferably 70 nm or less, still more preferably 60 nm or less, still more preferably 55 nm or less, still more preferably 53 nm or less, and still more preferably 50 nm or less. A high temperature may be a temperature of, for example, about 30° C. to 50° C., and a high humidity may be, for example, a relative humidity of about 70% to 100%.

From a viewpoint of still further suppressing occurrence of dropout, $S_{13.5}$ is preferably 40 nm or less, more preferably 38 nm or less, still more preferably 35 nm or less, still more preferably 32 nm or less, and still more preferably 29 nm or less. From the same viewpoint, $S_{13.5}$ is preferably 15 nm or more, more preferably 20 nm or more, still more preferably 22 nm or more, and still more preferably 24 nm or more.

$S_{0.5}$ and $S_{13.5}$ can be controlled according to the type of non-magnetic powder (hereinafter, referred to as a "protrusion forming agent".) that can mainly contribute to forming of a protrusion on the back coating layer surface among types of non-magnetic powder included in the back coating layer, a manufacturing condition of the magnetic recording medium, and the like. Details of this point will be described later.

Next, the magnetic layer, the back coating layer, a non-magnetic support, and a non-magnetic layer optionally included in the magnetic recording medium will be further described.

Magnetic Layer

Ferromagnetic Powder

As the ferromagnetic powder included in the magnetic layer, well-known ferromagnetic powder as ferromagnetic powder used in magnetic layers of various magnetic recording media can be used alone or in combination of two or more. From a viewpoint of improving recording density, it is preferable to use ferromagnetic powder having a small average particle size. From this point, the average particle size of ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from a viewpoint of magnetization stability, the average particle size of ferromagnetic powder is preferably 5 nm or more, more preferably 8 nm or more, still more preferably 10 nm or more, still more preferably 15 nm or more, and still more preferably 20 nm or more.

Hexagonal Ferrite Powder

Preferred specific examples of the ferromagnetic powder include hexagonal ferrite powder. For details of the hexagonal ferrite powder, for example, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to.

In the present invention and this specification, "hexagonal ferrite powder" refers to ferromagnetic powder in which a hexagonal ferrite type crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite type crystal structure in an X-ray diffraction spectrum obtained by X-ray diffraction analysis, it is determined that the hexagonal ferrite type crystal structure is detected as the main phase. In a case where only a single structure is detected by X-ray diffraction analysis, this detected structure is taken as the main phase. The hexagonal ferrite type crystal structure includes at least an iron atom, a divalent metal atom and an oxygen atom, as a constituent atom. The divalent metal atom is a metal atom that can be a divalent cation as an ion, and examples thereof may include an alkaline earth metal atom such as a strontium atom, a barium atom, and a calcium atom, a lead atom, and the like. In the present invention and this specification, hexagonal strontium ferrite powder means that the main divalent metal atom included in this powder is a strontium atom, and hexagonal barium ferrite powder means that the main divalent metal atom included in this powder is a barium atom. The main divalent metal atom refers to a divalent metal atom that accounts for the most on an at % basis among divalent metal atoms included in the powder. Here, a rare earth atom is not included in the above divalent metal atom. The "rare earth atom" in the present invention and this specification is selected from the group consisting of a scandium atom (Sc), an yttrium atom (Y), and a lanthanoid atom. The Lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder, which is an aspect of the hexagonal ferrite powder, will be described in more detail.

An activation volume of hexagonal strontium ferrite powder is preferably in a range of 800 to 1600 nm$^3$. The finely granulated hexagonal strontium ferrite powder having an activation volume in the above range is suitable for manufacturing a magnetic recording medium exhibiting excellent electromagnetic conversion characteristics. The activation volume of the hexagonal strontium ferrite powder is preferably 800 nm$^3$ or more, for example, 850 nm$^3$ or more. Further, from a viewpoint of further improving the electromagnetic conversion characteristics, the activation volume of the hexagonal strontium ferrite powder is more preferably 1500 nm$^3$ or less, still more preferably 1400 nm$^3$ or less, still more preferably 1300 nm$^3$ or less, still more preferably 1200 nm$^3$ or less, and still more preferably 1100 nm$^3$ or less. The same applies to an activation volume of the hexagonal barium ferrite powder.

The "activation volume" is a unit of magnetization reversal and is an index indicating the magnetic size of a particle. An activation volume described in the present invention and this specification and an anisotropy constant Ku which will be described later are values obtained from the following relational expression between a coercivity Hc and an activation volume V, by performing measurement in an Hc measurement portion at a magnetic field sweep rate of 3 minutes and 30 minutes using a vibrating sample magnetometer (measurement temperature: 23° C.±1° C.). For a unit of the anisotropy constant Ku, 1 erg/cc=1.0×10$^{-1}$ J/m$^3$.

$$Hc=2Ku/Ms\{1-[(kT/KuV)\ln(At/0.693)]^{1/2}\}$$

[In the above formula, Ku: anisotropy constant (unit: J/m$^3$), Ms: saturation magnetization (Unit: kA/m), k: Boltzmann constant, T: absolute temperature (unit: K), V: activation volume (unit: cm$^3$), A: spin precession frequency (unit: s$^{-1}$), t: magnetic field reversal time (unit: s)]

An index for reducing thermal fluctuation, in other words, improving thermal stability may include an anisotropy constant Ku. The hexagonal strontium ferrite powder preferably has Ku of 1.8×10$^5$ J/m$^3$ or more, and more preferably has Ku of 2.0×10$^5$ J/m$^3$ or more. Ku of the hexagonal strontium ferrite powder may be, for example, 2.5×10$^5$ J/m$^3$ or less. Here, it means that the higher Ku is, the higher thermal stability is, this is preferable, and thus, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In an aspect, the hexagonal strontium ferrite powder including a rare earth atom may have a rare earth atom surface layer portion uneven distribution property. In the present invention and this specification, the "rare earth atom surface layer portion uneven distribution property" means that a rare earth atom content with respect to 100 at % of an iron atom in a solution obtained by partially dissolving hexagonal strontium ferrite powder with an acid (hereinafter, referred to as a "rare earth atom surface layer portion content" or simply a "surface layer portion content" for a rare earth atom.) and a rare earth atom content with respect to 100 at % of an iron atom in a solution obtained by totally dissolving hexagonal strontium ferrite powder with an acid (hereinafter, referred to as a "rare earth atom bulk content" or simply a "bulk content" for a rare earth atom.) satisfy a ratio of a rare earth atom surface layer portion content/a rare earth atom bulk content >1.0. A rare earth atom content in hexagonal strontium ferrite powder which will be described later is the same meaning as the rare earth atom bulk content. On the other hand, partial dissolution using an acid dissolves a surface layer portion of a particle configuring hexagonal strontium ferrite powder, and thus, a rare earth atom content in a solution obtained by partial dissolution is a rare earth atom content in a surface layer portion of a particle configuring hexagonal strontium ferrite powder. A rare earth atom surface layer portion content satisfying a ratio of "rare earth atom surface layer portion content/rare earth atom bulk content >1.0" means that in a particle of hexagonal strontium ferrite powder, rare earth atoms are unevenly distributed in a surface layer portion (that is, more than an inside). The surface layer portion in the present invention and this specification means a partial region from a surface of a particle configuring hexagonal strontium ferrite powder toward an inside.

In a case where hexagonal strontium ferrite powder includes a rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle configuring hexagonal strontium ferrite powder contribute to suppression of a decrease in a reproducing output in repeated reproduction. It is supposed that this is because hexagonal strontium ferrite powder includes a rare earth atom with a bulk content in the above range, and rare earth atoms are unevenly distributed in a surface layer portion of a particle configuring hexagonal strontium ferrite powder, and thus it is possible to increase an anisotropy constant Ku. The higher a value of an anisotropy constant Ku is, the more a phenomenon called so-called thermal fluctuation can be suppressed (in other words, thermal stability can be improved). By suppressing occurrence of thermal fluctuation, it is possible to suppress a decrease in reproducing output during repeated reproduction. It is supposed that uneven distribution of rare earth atoms in a particulate surface layer portion of hexagonal strontium ferrite powder contributes to stabilization of spins of iron (Fe) sites in a crystal lattice of a surface layer portion, and thus, an anisotropy constant Ku may be increased.

Moreover, it is supposed that the use of hexagonal strontium ferrite powder having a rare earth atom surface layer portion uneven distribution property as a ferromagnetic powder in the magnetic layer also contributes to inhibition of a magnetic layer surface from being scraped by being slid with respect to the magnetic head. That is, it is supposed that hexagonal strontium ferrite powder having rare earth atom surface layer portion uneven distribution property can also contribute to an improvement of running durability of the magnetic recording medium. It is supposed that this may be because uneven distribution of rare earth atoms on a surface of a particle configuring hexagonal strontium ferrite powder contributes to an improvement of interaction between the particle surface and an organic substance (for example, a binding agent and/or an additive) included in the magnetic layer, and, as a result, a strength of the magnetic layer is improved.

From a viewpoint of further suppressing a decrease in reproducing output during repeated reproduction and/or a viewpoint of further improving the running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving hexagonal strontium ferrite powder. In the present invention and this specification, unless otherwise noted, the content of an atom means a bulk content obtained by totally dissolving hexagonal strontium ferrite powder. The hexagonal strontium ferrite powder including a rare earth atom may include only one kind of rare earth atom as the rare earth atom, or may include two or more kinds of rare earth atoms. The bulk content in the case of including two or more types of rare earth atoms is obtained for the total of two or more types of rare earth atoms. This also applies to other components in the present invention and this specification. That is, unless otherwise noted, a certain component may be used alone or in combination of two or more. A content amount or a content in a case where two or more components are used refers to that for the total of two or more components.

In a case where the hexagonal strontium ferrite powder includes a rare earth atom, the included rare earth atom may be any one or more of rare earth atoms. As a rare earth atom that is preferable from a viewpoint of further suppressing a decrease in reproducing output in repeated reproduction, there are a neodymium atom, a samarium atom, a yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms may be unevenly distributed in the surface layer portion of a particle configuring the hexagonal strontium ferrite powder, and the degree of uneven distribution is not limited. For example, for a hexagonal strontium ferrite powder having a rare earth atom surface layer portion uneven distribution property, a ratio between a surface layer portion content of a rare earth atom obtained by partial dissolution under dissolution conditions which will be described later and a bulk content of a rare earth atom obtained by total dissolution under dissolution conditions which will be described later, that is, "surface layer portion content/bulk content" exceeds 1.0 and may be 1.5 or more. "Surface layer portion content/bulk content" larger than 1.0 means that in a particle configuring the hexagonal strontium ferrite powder, rare earth atoms are unevenly distributed in the surface layer portion (that is, more than in the inside). Further, a ratio between a surface layer portion content of a rare earth atom obtained by partial dissolution under dissolution conditions which will be described later and a bulk content of a rare earth atom obtained by total dissolution under the dissolution conditions which will be described later, that is, "surface layer portion content/bulk content" may be, for example, 10.0 or less, 9.0 or less, 8.0 or less, 7.0 or less, 6.0 or less, 5.0 or less, or 4.0 or less. Here, in the hexagonal strontium ferrite powder having a rare earth atom surface layer portion uneven distribution property, the rare earth atoms may be unevenly distributed in the surface layer portion of a particle configuring the hexagonal strontium ferrite powder, and "surface layer portion content/bulk content" is not limited to the illustrated upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic recording medium, a part of the hexagonal strontium ferrite powder taken out from the magnetic layer is subjected to partial dissolution, and the other part is subjected to total dissolution. The hexagonal strontium ferrite powder can be taken out from the magnetic layer by a method described in a paragraph 0032 of JP2015-091747A, for example.

The partial dissolution means that dissolution is performed such that, at the end of dissolution, the residue of the hexagonal strontium ferrite powder can be visually checked in the solution. For example, by partial dissolution, it is possible to dissolve a region of 10 to 20 mass % of the particle configuring the hexagonal strontium ferrite powder with the total particle being 100 mass %. On the other hand, the total dissolution means that dissolution is performed such that, at the end of dissolution, the residue of the hexagonal strontium ferrite powder cannot be visually checked in the solution.

The partial dissolution and measurement of the surface layer portion content are performed by the following method, for example. Here, the following dissolution conditions such as an amount of sample powder are illustrative, and dissolution conditions for partial dissolution and total dissolution can be employed in any manner.

A container (for example, a beaker) containing 12 mg of sample powder and 10 mL of 1 mol/L hydrochloric acid is held on a hot plate at a set temperature of 70° C. for 1 hour. The obtained solution is filtered by a membrane filter of 0.1 μm. Elemental analysis of the filtrated solution is performed by an inductively coupled plasma (ICP) analyzer. In this way, the surface layer portion content of a rare earth atom with respect to 100 at % of an iron atom can be obtained. In a case where a plurality of types of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of sample powder and 10 mL of 4 mol/L hydrochloric acid is held on a hot plate at a set temperature of 80° C. for 3 hours. Thereafter, the method is carried out in the same manner as the partial dissolution and the measurement of the surface layer portion content, and the bulk content with respect to 100 at % of an iron atom can be obtained.

From a viewpoint of increasing the reproducing output in a case of reproducing data recorded on the magnetic recording medium, it is desirable that mass magnetization σs of the ferromagnetic powder included in the magnetic recording medium is high. In this regard, the hexagonal strontium ferrite powder including a rare earth atom but not having the rare earth atom surface layer portion uneven distribution property tends to have σs largely lower than the hexagonal strontium ferrite powder including no rare earth atom. On the other hand, it is considered that hexagonal strontium ferrite powder having a rare earth atom surface layer portion uneven distribution property is preferable in suppressing such a large decrease in σs. In an aspect, σs of the hexagonal strontium ferrite powder may be 45 A·m$^2$/kg or more, and may be 47 A·m$^2$/kg or more. On the other hand, from a viewpoint of noise reduction, σs is preferably 80 A·m$^2$/kg or less and more preferably 60 A·m$^2$/kg or less. σs can be measured using a well-known measuring device, such as a vibrating sample magnetometer, capable of measuring magnetic properties. In the present invention and this specification, unless otherwise noted, the mass magnetization σs is a value measured at a magnetic field intensity of 15 kOe. 1 [kOe]=$10^6/4\pi$ [A/m]

Regarding the content (bulk content) of a constituent atom of the hexagonal strontium ferrite powder, a strontium atom content may be, for example, in a range of 2.0 to 15.0 at % with respect to 100 at % of an iron atom. In an aspect, in the hexagonal strontium ferrite powder, a divalent metal atom included in the powder may be only a strontium atom. In another aspect, the hexagonal strontium ferrite powder may include one or more other divalent metal atoms in addition to a strontium atom. For example, a barium atom and/or a calcium atom may be included. In a case where another divalent metal atom other than a strontium atom is included, a barium atom content and a calcium atom content in the hexagonal strontium ferrite powder are, for example, in a range of 0.05 to 5.0 at % with respect to 100 at % of an iron atom, respectively.

As a crystal structure of hexagonal ferrite, a magnetoplumbite type (also referred to as an "M type".), a W type, a Y type, and a Z type are known. The hexagonal strontium ferrite powder may have any crystal structure. The crystal structure can be checked by X-ray diffraction analysis. In the hexagonal strontium ferrite powder, a single crystal structure or two or more crystal structures may be detected by X-ray diffraction analysis. For example, according to an aspect, in the hexagonal strontium ferrite powder, only the M-type crystal structure may be detected by X-ray diffraction analysis. For example, M-type hexagonal ferrite is represented by a composition formula of $AFe_{12}O_{19}$. Here, A represents a divalent metal atom, and in a case where the hexagonal strontium ferrite powder is the M-type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom can be, for example, 0.5 to 10.0 at % with respect to 100 at % of an iron atom. From a viewpoint of further suppressing a decrease in reproducing output in repeated reproduction, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in an aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving hexagonal strontium ferrite powder into a value expressed in at % using an atomic weight of each atom. Further, in the present invention and this specification, "not include" for a certain atom means that a content measured by an ICP analyzer after total dissolution is 0 mass %. A detection limit of the ICP analyzer is usually 0.01 parts per million (ppm) or less on a mass basis. The "not included" is used as a meaning including that an atom is included in an amount less than the detection limit of the ICP analyzer. In an aspect, the hexagonal strontium ferrite powder may not include a bismuth atom (Bi).

Metal Powder

Preferred specific examples of the ferromagnetic powder include ferromagnetic metal powder. For details of the ferromagnetic metal powder, for example, descriptions disclosed in paragraphs 0137 to 0141 of JP2011-216149A and paragraphs 0009 to 0023 of JP2005-251351A can be referred to.

ε-Iron Oxide Powder

Preferred specific examples of the ferromagnetic powder include ε-iron oxide powder. In the present invention and this specification, "ε-iron oxide powder" refers to ferromagnetic powder in which a ε-iron oxide type crystal structure is detected as a main phase by X-ray diffraction analysis. For example, in a case where the highest intensity diffraction peak is attributed to a ε-iron oxide type crystal structure in an X-ray diffraction spectrum obtained by X-ray diffraction analysis, it is determined that the ε-iron oxide type crystal structure is detected as the main phase. As a manufacturing method of the ε-iron oxide powder, a manufacturing method from a goethite, a reverse micelle method, and the like are known. All of the manufacturing methods are well known. Regarding a method of manufacturing ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. 5280 to 5284, J. Mater. Chem. C, 2013, 1, pp. 5200 to 5206 can be referred to, for example. Here, the manufacturing method of ε-iron oxide powder capable of being used as the ferromagnetic powder in the magnetic layer of the magnetic recording medium is not limited to the methods described here.

An activation volume of the ε-iron oxide powder is preferably in a range of 300 to 1500 $nm^3$. The finely granulated ε-iron oxide powder having an activation volume in the above range is suitable for manufacturing a magnetic recording medium exhibiting excellent electromagnetic conversion characteristics. The activation volume of the ε-iron oxide powder is preferably 300 $nm^3$ or more, for example, 500 $nm^3$ or more. Further, from a viewpoint of further improving the electromagnetic conversion characteristics, the activation volume of the ε-iron oxide powder is more preferably 1400 $nm^3$ or less, still more preferably 1300 $nm^3$ or less, still more preferably 1200 $nm^3$ or less, and still more preferably 1100 $nm^3$ or less.

An index for reducing thermal fluctuation, in other words, improving thermal stability may include an anisotropy constant Ku. The ε-iron oxide powder preferably has Ku of $3.0 \times 10^4$ $J/m^3$ or more, and more preferably has Ku of $8.0 \times 10^4$ $J/m^3$ or more. Ku of the ε-iron oxide powder may be, for example, $3.0 \times 10^5$ $J/m^3$ or less. Here, it means that the higher Ku is, the higher thermal stability is, this is preferable, and thus, a value thereof is not limited to the values exemplified above.

From a viewpoint of increasing the reproducing output in a case of reproducing data recorded on the magnetic recording medium, it is desirable that mass magnetization σs of the ferromagnetic powder included in the magnetic recording medium is high. In this regard, in an aspect, σs of the ε-iron oxide powder may be 8 $A \cdot m^2/kg$ or more, and may be 12 $A \cdot m^2/kg$ or more. On the other hand, from a viewpoint of noise reduction, σs of the ε-iron oxide powder is preferably 40 $A \cdot m^2/kg$ or less and more preferably 35 $A \cdot m^2/kg$ or less.

In the present invention and this specification, unless otherwise noted, an average particle size of various types of powder such as ferromagnetic powder is a value measured by the following method using a transmission electron microscope.

The powder is imaged at a magnification ratio of 100,000 using a transmission electron microscope, and the image is printed on printing paper so that the total magnification ratio is 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic average of the particle sizes of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size shown in Examples which will be described later is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and this specification, the powder means an aggregate of a plurality of particles. For example, ferromagnetic powder means an aggregate of a plurality of ferromagnetic particles. Further, the aggregate of the plurality of particles not only includes an aspect in which particles configuring the aggregate directly come into contact with each other, but also includes an aspect in which a binding agent or an additive which will be described later is interposed between the particles. The term "particle" is used to describe powder in some cases.

As a method of taking sample powder from the magnetic recording medium in order to measure the particle size, a method disclosed in a paragraph of 0015 of JP2011-048878A can be used, for example.

In the present invention and this specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

A content (filling percentage) of the ferromagnetic powder of the magnetic layer is preferably in a range of 50 to 90 mass % and more preferably in a range of 60 to 90 mass %. A high filling percentage of the ferromagnetic powder in the magnetic layer is preferable from a viewpoint of improving recording density.

Binding Agent

The above-described magnetic recording medium may be a coating type magnetic recording medium, and may include a binding agent in the magnetic layer. The binding agent is one or more resins. As the binding agent, various resins usually used as a binding agent pf a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. The resin may be a homopolymer or a copolymer. These resins can be used as the binding agent even in the back coating layer and/or a non-magnetic layer which will be described later.

For the binding agent described above, descriptions disclosed in paragraphs 0028 to 0031 of JP2010-024113A can be referred to. An average molecular weight of the resin used as the binding agent can be, for example, 10,000 or more and 200,000 or less as a weight-average molecular weight. The weight-average molecular weight of the present invention and this specification is a value obtained by performing polystyrene conversion of a value measured by gel permeation chromatography (GPC) under the following measurement conditions. A weight-average molecular weight of a binding agent shown in Examples which will be described later is a value obtained by performing polystyrene conversion of a value measured under the following measurement conditions. The binding agent can be used in an amount of, for example, 1.0 to 30.0 parts by mass with respect to 100.0 parts by mass of the ferromagnetic powder.

GPC device: HLC-8120 (manufactured by Tosoh Corporation)

Column: TSK gel Multipore HXL-M (manufactured by Tosoh Corporation, 7.8 mm inner diameter (ID)×30.0 cm)

Eluent: Tetrahydrofuran (THF)

In addition, a curing agent can also be used together with the resin which can be used as the binding agent. As the curing agent, in an aspect, a thermosetting compound which is a compound in which curing reaction (crosslinking reaction) proceeds due to heating can be used, and in another aspect, a photocurable compound in which a curing reaction (crosslinking reaction) proceeds due to light irradiation can be used. Curing reaction proceeds during a process of forming a magnetic layer, whereby at least a part of the curing agent can be included in the magnetic layer in a state of being reacted (crosslinked) with other components such as the binding agent. The same applies to the layer formed using this composition in a case where the composition used to form the other layer includes a curing agent. The preferred curing agent is a thermosetting compound, and polyisocyanate is suitable for this. For details of the polyisocyanate, descriptions disclosed in paragraphs 0124 and 0125 of JP2011-216149A can be referred to. The curing agent can be used in a magnetic layer forming composition in an amount of, for example, 0 to 80.0 parts by mass, and preferably 50.0 to 80.0 parts by mass, from a viewpoint of improving a strength of the magnetic layer, with respect to 100.0 parts by mass of the binding agent.

The above description regarding the binding agent and the curing agent can be applied to the back coating layer and/or the non-magnetic layer. In this case, the above description regarding the content can be applied by replacing the ferromagnetic powder with the non-magnetic powder.

Additive

The magnetic layer may include one or more kinds of additives, as necessary. As the additives, the curing agent described above is used as an example. In addition, examples of the additive which can be included in the magnetic layer include non-magnetic powder (for example, inorganic powder or carbon black), a lubricant, a dispersing agent, a dispersing assistant, an antibacterial agent, an antistatic agent, and an antioxidant. As the non-magnetic powder, non-magnetic powder which can function as an abrasive, or non-magnetic powder which can function as a protrusion forming agent which forms protrusions suitably protruded from the magnetic layer surface (for example, non-magnetic colloidal particles) is used. An average particle size of colloidal silica (silica colloidal particle) shown in Examples which will be described later is a value obtained by a method disclosed in a paragraph 0015 of JP2011-048878A as a method for measuring an average particle size. As an example of the additive that can be used in the magnetic layer containing the abrasive, a dispersing agent disclosed in paragraphs 0012 to 0022 of JP2013-131285A can be used as a dispersing agent for improving dispersibility of the abrasive. For example, for the lubricant, descriptions disclosed in paragraphs 0030 to 0033, 0035, and 0036 of JP2016-126817A can be referred to. The non-magnetic layer may include a lubricant. For the lubricant which may be included in the non-magnetic layer, descriptions disclosed in paragraphs 0030, 0031, 0034, 0035, and 0036 of JP2016-126817A can be referred to. For the dispersing agent, descriptions disclosed in paragraphs 0061 and 0071 of JP2012-133837A can be referred to. For the dispersing agent, descriptions disclosed in paragraphs 0061 and 0071 of JP2012-133837A and a paragraph 0035 of JP2017-016721A can be referred to. For the additive of the magnetic layer, descriptions disclosed in paragraphs 0035 to 0077 of JP2016-051493A can be referred to.

The dispersing agent may be included in the non-magnetic layer. For the dispersing agent which may be included in the non-magnetic layer, a description disclosed in a paragraph 0061 of JP2012-133837A can be referred to.

As various additives, a commercially available product can be suitably selected or manufactured by a well-known method according to the desired properties, and any amount thereof can be used.

The magnetic layer described above can be provided directly on a surface of the non-magnetic support or indirectly through the non-magnetic layer.

Non-Magnetic Layer

Next, the non-magnetic layer will be described. The above magnetic recording medium may have a magnetic layer directly on the non-magnetic support, or may have a non-magnetic layer including non-magnetic powder and a binding agent between the non-magnetic support and the magnetic layer. Non-magnetic powder used for the non-magnetic layer may be inorganic powder or organic powder. In addition, carbon black and the like can be used. Examples of the inorganic powder include types of powder of metal, metal oxide, metal carbonate, metal sulfate, metal nitride, metal carbide, and metal sulfide. These types of non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. A content (filling percentage) of the non-magnetic powder of the non-magnetic layer is preferably in a range of 50 to 90 mass % and more preferably in a range of 60 to 90 mass %.

The non-magnetic layer can include a binding agent, and can also include an additive. For other details of a binding agent or an additive of the non-magnetic layer, a well-known technology regarding the non-magnetic layer can be applied. In addition, in regards to the type and the content of the binding agent, and the type and the content of the additive, for example, a well-known technology regarding the magnetic layer can be applied.

In the present invention and this specification, the non-magnetic layer also includes a substantially non-magnetic layer including a small amount of ferromagnetic powder as impurities, for example, or intentionally, together with the non-magnetic powder. Here, the substantially non-magnetic layer is a layer having a residual magnetic flux density equal to or smaller than 10 mT, a layer having a coercivity equal to or smaller than 100 Oe, or a layer having a residual magnetic flux density equal to or smaller than 10 mT and a coercivity equal to or smaller than 100 Oe. It is preferable that the non-magnetic layer does not have a residual magnetic flux density and a coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, and aromatic polyamide subjected to biaxial stretching are used. Among these, polyethylene terephthalate, polyethylene naphthalate, and polyamide are preferable. A corona discharge, a plasma treatment, an easy-bonding treatment, or a heat treatment may be performed with respect to these supports in advance.

Back Coating Layer

The above magnetic recording medium includes a back coating layer including non-magnetic powder on a surface side of a non-magnetic support opposite to a surface side provided with a magnetic layer. The non-magnetic powder included in the back coating layer can preferably be a protrusion forming agent and one or more other types of non-magnetic powder.

Protrusion Forming Agent

As the protrusion forming agent, a particle of an organic substance or a particle of an inorganic substance can be used, and from a viewpoint of easy control of the difference ($S_{0.5}-S_{13.5}$), it is preferable to use a particle of an organic substance, and it is more preferable to use an organic resin particle. The organic resin particle is a particle having an organic resin as a main component. The main component refers to a component that accounts for the most on a mass basis among components forming a particle, and may be, for example, a component that accounts for 80 mass % to 100 mass %. Examples of the organic resin forming the organic resin particle include an acrylic resin, a melamine resin, a fluororesin, a benzoguanamine resin, a vinyl resin, and the like. The acrylic resin includes a methacrylic resin. The resin forming the organic resin particle may be a homopolymer or a copolymer. As the organic resin particle, a commercially available product may be used, or those manufactured by a well-known method may be used.

The above $S_{0.5}$ can be controlled mainly by a particle size of the protrusion forming agent. An average particle size of the protrusion forming agent is, for example, 30 nm to 4 μm, preferably 30 nm to 2 μm, and more preferably 40 nm to 1 μm. $S_{13.5}$ can be controlled by a method of preparing a back coating layer forming composition, in addition to the particle size of the protrusion forming agent. This point will be described later. A density of the protrusion forming agent may be, for example, in a range of 0.5 to 3.0 g/cm³, preferably in a range of 0.8 to 2.5 g/cm³, and more preferably in a range of 0.8 to 2.0 g/cm³. The density of the protrusion forming agent is a value obtained by a pycnometer method.

A content of the protrusion forming agent in the back coating layer is preferably 1.0 to 4.0 parts by mass, and more preferably 1.2 to 3.5 parts by mass with respect to 100.0 parts by mass of the other non-magnetic powder. The back coating layer more preferably includes 1.0 to 4.0 parts by mass of the organic resin particle, and still more preferably includes 1.2 to 3.5 parts by mass of the organic resin particle with respect to 100.0 parts by mass of the other non-magnetic powder.

Other Non-Magnetic Powder

For the other non-magnetic powder included in the back coating layer, the above description regarding the non-magnetic powder in the non-magnetic layer can be referred to. As the other non-magnetic powder, preferably, either one or both of carbon black and non-magnetic powder other than carbon black can be used. Examples of the non-magnetic powder other than carbon black include non-magnetic inorganic powder. Specific examples thereof include non-magnetic inorganic powder of iron oxide such as α-iron oxide, titanium oxide such as titanium dioxide, cerium oxide, tin oxide, tungsten oxide, ZnO, $ZrO_2$, $SiO_2$, $Cr_2O_3$, α-alumina, β-alumina, γ-alumina, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide. The preferable non-magnetic inorganic powder is non-magnetic inorganic oxide powder, more preferably α-iron oxide and titanium oxide, and still more preferably α-iron oxide.

A shape of the non-magnetic powder other than carbon black may be any of a needle shape, a sphere shape, a polyhedron shape, and a plate shape. An average particle size of the non-magnetic powder is preferably in a range of 5 nm to 2.00 μm, and more preferably in a range of 10 nm to 200 nm. In addition, a BET specific surface area of the non-magnetic powder other than carbon black is preferably in a range of 1 to 100 m²/g, more preferably in a range of 5 to 70 m²/g, and still more preferably in a range of 10 to 65 m²/g. On the other hand, an average particle size of carbon black is, for example, in a range of 5 to 80 nm, preferably in a range of 10 to 50 nm, and more preferably in a range of 10 to 40 nm. A content of carbon black with respect to a total amount of the other non-magnetic powder of 100.0 parts by mass can be set in a range of, for example, 10.0 to 100.0 parts by mass. The total amount of the other non-magnetic powder may be the amount of carbon black. Alternatively, the total amount of the other non-magnetic powder may be the content of the non-magnetic powder other than carbon black. Values of $S_{0.5}$ and $S_{13.5}$ tend to increase as a proportion of carbon black in the other non-magnetic powder increases. For a content (filling percentage) of the non-magnetic powder in the back coating layer, the above description regarding the non-magnetic powder in the non-magnetic layer can be referred to.

The back coating layer can include a binding agent, and can also include an additive. In regards to the binding agent and the additive of the back coating layer, the well-known technology regarding the back coating layer can be applied, and the well-known technology regarding the treatment of the magnetic layer and/or the non-magnetic layer can be applied. For example, for the back coating layer, descriptions disclosed in paragraphs 0018 to 0020 of JP2006-331625A and page 4, line 65 to page 5, line 38 of U.S. Pat. No. 7,029,774B can be referred to.

As an example of the additive which can be included in the back coating layer, a lubricant is used.

Examples of the lubricant include a fatty acid, a fatty acid ester, and a fatty acid amide, and the back coating layer can be formed using one or more selected from the group consisting of a fatty acid, a fatty acid ester, and a fatty acid amide.

Examples of the fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferred, and stearic acid is more preferred. The fatty acid may be included in the back coating layer in a form of a salt such as a metal salt.

Examples of the fatty acid ester include esters of lauric acid, myristic acid, palmitic acid, stearic acid, oleic acid, linoleic acid, linolenic acid, behenic acid, erucic acid, and elaidic acid. Specific examples thereof include, for example, butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

Examples of the fatty acid amide include amides of various fatty acids described above, for example, lauric acid amide, myristic acid amide, palmitic acid amide, stearic acid amide, and the like.

A content of the fatty acid of the back coating layer is, for example, 0 to 10.0 parts by mass, preferably 0.1 to 10.0 parts by mass, and more preferably 1.0 to 7.0 parts by mass per 100.0 parts by mass of the non-magnetic powder included in the back coating layer. A content of the fatty acid ester of the back coating layer is, for example, 0.1 to 10.0 parts by mass and preferably 1.0 to 5.0 parts by mass per 100.0 parts by mass of the non-magnetic powder included in the back coating layer. A content of the fatty acid amide of the back coating layer is, for example, 0 to 3.0 parts by mass, preferably 0 to 2.0 parts by mass, and more preferably 0 to 1.0 parts by mass per 100.0 parts by mass of the non-magnetic powder included in the back coating layer.

The above $S_{0.5}$ and $S_{13.5}$ are values measured after n-hexane cleaning. In a case where a liquid film of a lubricant exists on the surface of the back coating layer that is pressed during measurement of a spacing, the measured spacing becomes narrow by a thickness of the liquid film. With respect to this, it is supposed that a lubricant that can exist as a liquid film during pressing can be removed by n-hexane cleaning. Therefore, it is considered that by measuring a spacing after n-hexane cleaning, the measured value of the spacing can be obtained as a value satisfactorily corresponding to a height of a protrusion on the back coating layer surface in a pressed state.

Various Thicknesses

For thicknesses of the non-magnetic support and each layer in the magnetic recording medium, a thickness of the non-magnetic support is, for example, 3.0 to 80.0 µm, preferably in a range of 3.0 to 50.0 µm, and more preferably in a range of 3.0 to 10.0 µm.

A thickness of the magnetic layer can be optimized according to a saturation magnetization amount or a head gap length, and a band of a recording signal of the used magnetic head, and is, for example, 10 nm to 100 nm, and, from a viewpoint of high density recording, is preferably in a range of 20 to 90 nm and more preferably in a range of 30 to 70 nm. The magnetic layer may be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 50 nm or more, preferably 70 nm or more, and more preferably 100 nm or more. In addition, the thickness of the non-magnetic layer is preferably 800 nm or less, and more preferably 500 nm or less.

A thickness of the back coating layer may be, for example, 0.1 µm or more. The thickness of the back coating layer is preferably 0.9 µm or less, more preferably 0.7 µm or less, and still more preferably 0.5 µm or less.

Thicknesses of each layer and the non-magnetic support of the magnetic recording medium can be obtained by a well-known film thickness measurement method. As an example, a cross section of the magnetic recording medium in a thickness direction is exposed by well-known means such as an ion beam or a microtome, and then a cross section observation is performed using a scanning electron microscope in the exposed cross section. In the cross section observation, various thicknesses can be obtained as a thickness obtained at any one portion of the cross section, or an arithmetic average of thicknesses obtained at a plurality of portions of two or more portions, for example, two portions which are randomly extracted. In addition, the thickness of each layer may be obtained as a designed thickness calculated according to manufacturing conditions.

Manufacturing Method

A composition for forming the magnetic layer, the non-magnetic layer, or the back coating layer usually contains a solvent together with the various components described above. As a solvent, various organic solvents generally used for manufacturing the magnetic recording medium can be used. Among these, from a viewpoint of solubility of the binding agent usually used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent in each layer forming composition is not particularly limited, and can be set to the same as that of each layer forming composition of a typical coating type magnetic recording medium. In addition, a process of preparing each layer forming composition can generally include at least a kneading process, a dispersing process, and a mixing process provided before and after these processes as necessary. Each process may be divided into two or more stages. Components used for the preparation of each layer forming composition may be added at an initial stage or in a middle stage of each process. In addition, each component may be separately added in two or more processes. For example, a binding agent may be added separately in a kneading process, a dispersing process, and a mixing process for adjusting a viscosity after dispersion. In a process of manufacturing the magnetic recording medium, a well-known manufacturing technology in a related art can be used in a part or all of the processes. In the kneading process, an open kneader, a continuous kneader, a pressure kneader, or a kneader having a strong kneading force such as an extruder is preferably used. Details of the kneading treatment are described in JP1989-106338A (JP-H01-106338A) and JP1989-079274A (JP-H01-079274A). In addition, in order to disperse each layer forming composition, glass beads and/or other beads can be used. As such dispersed beads, zirconia beads, titania beads, and steel beads which are dispersed beads having a high specific gravity are suitable. These dispersed beads are preferably used by optimizing a particle diameter (bead diameter) and filling percentage. As a dispersing device, a well-known dispersing device can be used. Each layer forming composition may be filtered by a well-known method before being subjected to a coating process. The filtering can be performed by using a filter, for example. As the filter used for the filtering, a filter having a pore diameter of 0.01 to 3 µm (for example, filter made of glass fiber or filter made of polypropylene) can be used, for example.

In an aspect, in a process of preparing the back coating layer forming composition, after a dispersion liquid including a protrusion forming agent (hereinafter, referred to as a "protrusion forming agent liquid".) is prepared, the protrusion forming agent liquid can be mixed with various components of the back coating layer forming composition such as the other non-magnetic powder.

Preferably, the protrusion forming agent liquid can be prepared by dispersing the protrusion forming agent in an organic solvent including an organic compound. The organic compound is preferably an alkyl group-containing compound. The alkyl group contained in the alkyl group-containing compound preferably has 5 or more carbon atoms, more preferably 6 or more carbon atoms, still more preferably 7 or more carbon atoms, and still more preferably 8 or more carbon atoms. The number of carbon atoms of the alkyl group may be, for example, 20 or less, 18 or less, or 16 or less. As the alkyl group, a chain alkyl group is preferable. The chain alkyl group may be a straight chain alkyl group or a branched alkyl group. It is considered that preparation of the protrusion forming agent liquid by performing the dispersion treatment in the organic solvent including the alkyl group-containing compound mainly contributes to reduction of the value of the spacing $S_{13.5}$. The present inventor supposes that this is because the alkyl group-containing compound exerts an action of enhancing an affinity between the protrusion forming agent (preferably an organic resin particle) and other components (for example, a binding agent) in the back coating layer, whereby the protrusion forming agent becomes easy to move in the back coating layer, and as a result, a protrusion formed by the protrusion forming agent existing on the back coating layer surface easily sinks into the back coating layer in a case where a high pressure is applied. The alkyl group may be unsubstituted or may have a substituent. Examples of the substituent include a hydroxy group, an alkoxy group (for example, an alkoxy group having 1 to 6 carbon atoms), a halogen atom (for example, a fluorine atom, a chlorine atom, a bromine atom), a cyano group, an amino group, a nitro group, an acyl group, a carboxy group, or a salt thereof. For the alkyl group having a substituent, the number of carbon atoms refers to the number of carbon atoms in a portion not including a substituent. The number of alkyl groups contained in the alkyl group-containing compound may be one or more, may be two or more, and may be, for example, about 2 to 3. In a case where the alkyl group-containing compound has two or more alkyl groups, the two or more alkyl groups may be the same alkyl group or different alkyl groups. The alkyl group-containing compound can be, for example, in an aspect, an organic amine compound. The organic amine compound may be any of a primary amine, a secondary amine, and a tertiary amine. A primary amine containing an alkyl group can be represented by $RNH_2$, a secondary amine can be represented by $R_2NH$, and a tertiary amine can be represented by $R_3N$, where R represents an alkyl group, and a plurality of the alkyl groups R included in the secondary amine and the tertiary amine may be the same alkyl group or different alkyl groups. In another aspect, the alkyl group-containing compound can be an organic phosphorus compound. As the organic phosphorus compound, an organic phosphonic acid can be used. An alkyl group-containing phosphonic acid can be represented by $RP(=O)(OH)_2$, where R represents an alkyl group. The protrusion forming agent liquid can be prepared as a dispersion liquid including, for example, 2.0 to 20.0 parts by mass of the protrusion forming agent and 5.0 to 100.0 parts by mass of the organic solvent with respect to 1.0 part by mass of the organic compound (preferably an alkyl group-containing compound). The dispersion liquid can be prepared by a well-known dispersion treatment such as an ultrasonic treatment. For example, the ultrasonic treatment can be performed for about 1 to 300 minutes at an ultrasonic output of about 10 to 2000 watts per 200 cc (1 cc=1 cm$^3$). Moreover, the filtering may be performed after the dispersion treatment. For the filter used for the filtering, the above description can be referred to.

The magnetic layer can be formed, for example, by directly applying the magnetic layer forming composition onto the non-magnetic support or performing multilayer applying of the magnetic layer forming composition with the non-magnetic layer forming composition in order or at the same time. In a form of performing an orientation treatment, the orientation treatment is performed on a coating layer of the magnetic layer forming composition in an orientation zone while the coating layer is in a wet state. For the orientation treatment, the various well-known technologies including a description disclosed in a paragraph 0052 of JP2010-024113A can be used. For example, a vertical orientation treatment can be performed by a well-known method such as a method using a polar opposing magnet. In the orientation zone, a drying speed of the coating layer can be controlled depending on a temperature and a flow rate of dry air and/or a transportation speed in the orientation zone. The coating layer may be preliminarily dried before the transportation to the orientation zone.

The back coating layer can be formed by applying the back coating layer forming composition onto a side of the non-magnetic support opposite to a side provided with the magnetic layer (or to be provided with the magnetic layer).

For details of coating for forming each layer, a description disclosed in a paragraph 0066 of JP2010-0231843A can be referred to. For other various processes for manufacturing the magnetic recording medium, descriptions disclosed in paragraphs 0067 to 0070 of JP 2010-231843A can be referred to.

It is possible to form a servo pattern in the manufactured magnetic recording medium by a well-known method in order to enable tracking control of the magnetic head in the magnetic recording and reproducing apparatus, control of a running speed of the magnetic recording medium, and the like. The "formation of the servo pattern" can also be referred to as "recording of a servo signal". The magnetic recording medium may be a tape-shaped magnetic recording medium (magnetic tape) in as aspect, and may be a disk-shaped magnetic recording medium (magnetic disk) in another aspect. Hereinafter, the formation of the servo patterns will be described using a magnetic tape as an example.

The servo pattern is usually formed along a longitudinal direction of the magnetic tape. As a system of control (servo control) using a servo signal, a timing-based servo (TBS), an amplitude servo, a frequency servo, and the like are used.

As shown in a european computer manufacturers association (ECMA) –319, a magnetic tape conforming to a linear tape-open (LTO) standard (generally referred to as an "LTO tape".) employs a timing-based servo system. In the timing-based servo system, the servo pattern is formed by continuously disposing a plurality of pairs of non-parallel magnetic stripes (also referred to as "servo stripes".) in a longitudinal direction of the magnetic tape. As described above, the reason why the servo pattern is formed of a pair of non-parallel magnetic stripes is to indicate, to a servo signal reading element passing over the servo pattern, a passing position thereof. Specifically, the pair of magnetic stripes is formed so that an interval thereof continuously changes along a width direction of the magnetic tape, and the servo signal reading element reads the interval to thereby sense a relative position between the servo pattern and the servo signal reading element. Information on this relative position enables tracking on a data track. Therefore, a plurality of servo tracks are usually set on the servo pattern along a width direction of the magnetic tape.

A servo band is formed of servo signals continuous in a longitudinal direction of the magnetic tape. A plurality of the servo bands are usually provided on the magnetic tape. For example, in an LTO tape, the number is five. A region interposed between two adjacent servo bands is referred to as a data band. The data band is formed of a plurality of data tracks, and each data track corresponds to each servo track.

Further, in an aspect, as shown in JP2004-318983A, information indicating a servo band number (referred to as "servo band identification (ID)" or "unique data band identification method (UDIM) information".) is embedded in each servo band. This servo band ID is recorded by shifting a specific one of the plurality of pairs of the servo stripes in the servo band so that positions thereof are relatively displaced in a longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

Incidentally, as a method for uniquely specifying the servo band, there is a method using a staggered method as shown in ECMA-319. In this staggered method, a group of pairs of non-parallel magnetic stripes (servo stripes) disposed continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading elements.

As shown in ECMA-319, information indicating a position of the magnetic tape in the longitudinal direction (also referred to as "longitudinal position (LPOS) information".) is usually embedded in each servo band. This LPOS information is also recorded by shifting the positions of the pair of servo stripes in the longitudinal direction of the magnetic tape, as the UDIM information. Here, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for forming a servo pattern is called a servo write head. The servo write head has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 μm or less, 1 to 10 μm, 10 μm or more, and the like.

Before the servo pattern is formed on the magnetic tape, the magnetic tape is usually subjected to a demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. The AC erasing is performed by gradually decreasing an intensity of the magnetic field while inverting a direction of the magnetic field applied to the magnetic tape. On the other hand, the DC erasing is performed by applying a one-direction magnetic field to the magnetic tape. As the DC erasing, there are two methods. A first method is horizontal DC erasing of applying a one-direction magnetic field along a longitudinal direction of the magnetic tape. A second method is vertical DC erasing of applying a one-direction magnetic field along a thickness direction of the magnetic tape. The erasing treatment may be performed on the entire magnetic tape or may be performed on each servo band of the magnetic tape.

A direction of the magnetic field of the servo pattern to be formed is determined according to a direction of the erasing. For example, in a case where the horizontal DC erasing is performed on the magnetic tape, the servo pattern is formed so that the direction of the magnetic field is reverse to the direction of the erasing. Therefore, an output of a servo signal obtained by reading the servo pattern can be increased. As shown in JP2012-053940A, in a case where a magnetic pattern is transferred to, using the gap, a magnetic tape that has been subjected to vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

The magnetic tape is usually accommodated in a magnetic tape cartridge and the magnetic tape cartridge is mounted in the magnetic recording and reproducing apparatus.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic recording and reproducing apparatus for recording and/or reproducing data on the magnetic tape, the magnetic tape is pulled out of the magnetic tape cartridge to be wound around the reel on the magnetic recording and reproducing apparatus side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic recording and reproducing apparatus side. During this time, data is recorded and/or reproduced as the magnetic head and the magnetic layer surface of the magnetic tape come into contact with each other to be slid on each other. With respect to this, in the dual reel type magnetic tape cartridge, both reels of the supply reel and the winding reel are provided in the magnetic tape cartridge. The magnetic tape cartridge may be either a single reel type or a dual reel type magnetic tape cartridge. Well-known technologies can be applied to other details of the magnetic tape cartridge.

Magnetic Recording and Reproducing Apparatus

Another aspect of the present invention relates to a magnetic recording and reproducing apparatus including the magnetic recording medium described above and a magnetic head.

In the present invention and this specification, the "magnetic recording and reproducing apparatus" means an apparatus capable of performing at least one of the recording of data on the magnetic recording medium or the reproducing of data recorded on the magnetic recording medium. Such an apparatus is generally called a drive. The magnetic recording and reproducing apparatus can be a sliding type magnetic recording and reproducing apparatus. The sliding type magnetic recording and reproducing apparatus is an apparatus in which the magnetic layer surface and the magnetic head come into contact with each other to be slid on each other, in a case of performing the recording of data on the magnetic recording medium and/or reproducing of the recorded data.

The magnetic head included in the magnetic recording and reproducing apparatus can be a recording head capable of performing the recording of data on the magnetic recording medium, or can be a reproducing head capable of performing the reproducing of data recorded on the magnetic recording medium. In addition, in an aspect, the magnetic recording and reproducing apparatus can include both of a recording head and a reproducing head as separate magnetic heads. In another aspect, the magnetic head included in the magnetic recording and reproducing apparatus can have a configuration that both of an element for recording data (recording element) and an element for reproducing data (reproducing element) are included in one magnetic head. Hereinafter, the element for recording and the element for reproducing data are collectively referred to as an "element for data". As the reproducing head, a magnetic head (MR head) including a magnetoresistive (MR) element capable of sensitively reading data recorded on the magnetic tape as a reproducing element is preferable. As the MR head, various known MR heads such as an anisotropic magnetoresistive (AMR) head, a giant magnetoresistive (GMR) head, and a tunnel magnetoresistive (TMR) head can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic recording and reproducing apparatus. For example, a magnetic head that records data and/or reproduces recorded data (hereinafter also referred to as "recording and reproducing head".) can include two servo signal reading elements, and the two servo signal reading elements can read two adjacent servo bands simultaneously. One or a plurality of elements for data can be disposed between the two servo signal reading elements.

In the magnetic recording and reproducing apparatus, recording of data on the magnetic recording medium and/or reproducing of data recorded on the magnetic recording medium can be performed as the magnetic layer surface of the magnetic recording medium and the magnetic head come into contact with each other to be slid on each other. The above magnetic recording and reproducing apparatus needs only to include the magnetic recording medium according to an aspect of the present invention, and the well-known technology can be applied to the others.

For example, in a case where data is recorded on the magnetic recording medium on which a servo pattern is formed and/or recorded data is reproduced, first, tracking is performed using a servo signal obtained by reading the servo pattern. That is, by causing the servo signal reading element to follow a predetermined servo track, the element for data is controlled to pass over the target data track. Displacement of the data track is performed by changing a servo track to be read by the servo signal reading element in a tape width direction.

The recording and reproducing head can also perform recording and/or reproducing with respect to other data bands. In this case, the servo signal reading element may be displaced to a predetermined servo band using the above described UDIM information, and tracking for the servo band may be started.

EXAMPLES

Hereinafter, the present invention will be described based on examples. Here, the present invention is not limited to aspects shown in the examples. Unless otherwise specified, "parts" and "%" in the following description indicate "parts by mass" and "mass %". eq is an equivalent and is a unit that cannot be converted into an SI unit. The processes and evaluations in the following description were performed in an environment of an atmosphere temperature of 23° C.±1° C., unless otherwise specified.

Example 1

List of each layer forming composition is shown below.
List of Magnetic Layer Forming Composition
Magnetic Liquid
Ferromagnetic powder (see Table 1): 100.0 parts
Oleic acid: 2.0 parts
Vinyl chloride copolymer (MR-104 manufactured by Kaneka Corporation): 10.0 parts
$SO_3Na$ group-containing polyurethane resin: 4.0 parts
(weight-average molecular weight: 70,000, $SO_3Na$ group: 0.07 meq/g)
Polyalkyleneimine polymer (synthetic product obtained by the method disclosed in paragraphs 0115 to 0123 of JP2016-051493A): 6.0 parts
Methyl ethyl ketone: 150.0 parts
Cyclohexanone: 150.0 parts
Abrasive Liquid
α-alumina (Brunauer-emmett-teller (BET) specific surface area: 19 $m^2/g$): 6.0 parts
$SO_3Na$ group-containing polyurethane resin: 0.6 parts
(weight-average molecular weight: 70,000, $SO_3Na$ group: 0.1 meq/g)
2,3-dihydroxynaphthalene: 0.6 parts
Cyclohexanone: 23.0 parts
Silica Sol
Colloidal silica (average particle size: 120 nm): 2.0 parts
Methyl ethyl ketone: 8.0 parts
Other Components
Stearic acid: 3.0 parts
Stearic acid amide: 0.3 parts
Butyl stearate: 6.0 parts
Methyl ethyl ketone: 110.0 parts
Cyclohexanone: 110.0 parts
Polyisocyanate (CORONATE (registered trademark) L manufactured by Tosoh Corporation): 3.0 parts
List of Non-Magnetic Layer Forming Composition
Non-magnetic inorganic powder
α-iron oxide (average particle size: 10 nm, BET specific surface area: 75 $m^2/g$): 100.0 parts
Carbon black (average particle size: 20 nm): 25.0 parts
$SO_3Na$ group-containing polyurethane resin (weight-average molecular weight: 70,000, $SO_3Na$ group: 0.2 meq/g): 18.0 parts
Stearic acid: 1.0 part
Cyclohexanone: 300.0 parts
Methyl ethyl ketone: 300.0 parts
List of Back Coating Layer Forming Composition
Protrusion Forming Agent Liquid
Protrusion forming agent (see Table 1): 1.3 parts
Organic compound (see Table 1): 0.3 parts
Methyl ethyl ketone: 9.0 parts
Cyclohexanone: 6.0 parts
Other Components
α-iron oxide: see Table 1
Average particle size (average long axis length): 150 nm
Average acicular ratio: 7
BET specific surface area: 52 $m^2/g$
Carbon black: see Table 1
Average particle size: 20 nm
Vinyl chloride copolymer (MR-104 manufactured by Kaneka Corporation): 12.0 parts
$SO_3Na$ group-containing polyurethane resin: 6.0 parts
Phenylphosphonic acid: 3.0 parts Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts Preparation of Magnetic Layer Forming Composition A magnetic layer forming composition was prepared by the following method.

Various components of the magnetic liquid were dispersed (bead dispersion) for 24 hours using a batch type vertical sand mill to prepare a magnetic liquid. As dispersed beads, zirconia beads having a bead diameter of 0.5 mm were used.

Various components of the above abrasive liquid were mixed and then the mixture was put in a horizontal beads mill dispersing device together with zirconia beads having a bead diameter of 0.3 mm, and a proportion of the bead volume to the total of the abrasive liquid volume and the bead volume was adjusted to be 80%, and a beads mill dispersion treatment was performed for 120 minutes. The liquid after the treatment was taken out and subjected to ultrasonic dispersion filtration treatment using a flow type ultrasonic dispersion filtration device. Thereby, the abrasive liquid was prepared.

The prepared magnetic liquid and abrasive liquid, and the silica sol and other components were put into a dissolver or a stirrer and stirred for 30 minutes at a circumferential speed of 10 m/sec, and subjected to a treatment of 3 passes at a flow rate of 7.5 kg/min by a flow type ultrasonic dispersing device, and then a magnetic layer forming composition was prepared by filtration through a filter having a pore diameter of 1 µm.

Preparation of Non-Magnetic Layer Forming Composition

Various components of the above non-magnetic layer forming composition were dispersed using zirconia beads having a bead diameter of 0.1 mm by a batch type vertical sand mill for 24 hours, and then filtered using a filter having a pore diameter of 0.5 µm. Thereby, the non-magnetic layer forming composition was prepared.

Preparation of Back Coating Layer Forming Composition

The components of the above protrusion forming agent liquid were mixed and then the mixture was subjected to an ultrasonic treatment (dispersion treatment) for 60 minutes at an ultrasonic output of 500 watts per 200 cc by a horn type ultrasonic dispersing device, and the obtained dispersion liquid was filtered using a filter having a pore diameter of 0.5 µm. Thereby, the protrusion forming agent liquid was prepared.

Components other than a lubricant (stearic acid and butyl stearate), polyisocyanate, and 200.0 parts of cyclohexanone among the other components of the above back coating layer forming composition were kneaded and diluted by an open kneader, and then subjected to a dispersion treatment of 12 passes using a horizontal beads mill dispersing device and zirconia beads having a bead diameter of 1 mm, by setting a bead filling percentage to 80 volume %, a circumferential speed of a rotor distal end to 10 m/sec, and a retention time for 1 pass to 2 minutes. A lubricant (stearic acid and butyl stearate), polyisocyanate, and 200.0 parts of cyclohexanone were added to the obtained dispersion liquid and stirred with a dissolver. The dispersion liquid obtained as described above was mixed with the protrusion forming agent liquid, and the mixed liquid was filtered using a filter having a pore diameter of 1 µm. Thereby, the back coating layer forming composition was prepared.

Manufacturing of Magnetic Tape

The non-magnetic layer forming composition prepared in the above section was applied onto a surface of a biaxially stretched polyethylene naphthalate support having a thickness of 5.0 µm and was dried so that a thickness after drying becomes 400 nm, and thus a non-magnetic layer was formed. After that, the magnetic layer forming composition prepared in the above section was applied onto a surface of the non-magnetic layer so that a thickness after drying becomes 70 nm, and thus a coating layer was formed. While this coating layer of the magnetic layer forming composition is in a wet (undried) state, a vertical orientation treatment was performed in which a magnetic field of a magnetic field intensity of 0.3 T was applied in a direction perpendicular to a surface of the coating layer, and then the surface of the coating layer was dried. Thereafter, the back coating layer forming composition prepared in the above section was applied onto an opposite surface of the support so that the thickness after drying is a thickness of 0.2 µm, and then was dried. Thereby, a magnetic tape original roll was manufactured.

The manufactured magnetic tape original roll was subjected to a calendering treatment (surface smoothing treatment) by a calender formed of only metal rolls at a speed of 100 m/min, a linear pressure of 300 kg/cm, and a surface temperature of a calendering roll of 100° C. Then, a heat treatment was performed in an environment of an atmosphere temperature of 70° C. for 36 hours. After the heat treatment, the magnetic tape original roll was slit by a cutter to obtain a magnetic tape having ½ inches (0.0127 meters) width.

In a state where the magnetic layer of the manufactured magnetic tape was demagnetized, a servo pattern having disposition and a shape according to a linear tape-open (LTO) Ultrium format was formed on the magnetic layer by using a servo write head mounted on a servo writer. In this way, a magnetic tape having a data band, a servo band, and a guide band in disposition according to the LTO Ultrium format in the magnetic layer, and having a servo pattern having disposition and the shape according to the LTO Ultrium format on the servo band was obtained.

Thus, a magnetic tape of Example 1 was obtained.

Examples 2 to 11 and Comparative Examples 1 to 9

A magnetic tape was obtained in the same manner as in Example 1 except that the items shown in Table 1 were changed as shown in Table 1. In Comparative Example 1, a back coating layer forming composition was prepared without using a protrusion forming agent liquid.

Protrusion Forming Agent

A protrusion forming agent used in preparation of a back coating layer forming composition for manufacturing magnetic tapes of Examples or Comparative Examples is as follows.

Protrusion forming agent A (organic resin particle): Epostar MX100W (acrylic cross-linked resin) manufactured by Nippon Shokubai Co., Ltd., average particle size of 150 nm, and density of 1.2 g/cm$^3$ Protrusion forming agent B (organic resin particle): Epostar SS (melamine-formaldehyde condensate) manufactured by Nippon Shokubai Co., Ltd., average particle size of 100 nm, and density of 1.5 g/cm$^3$ Protrusion forming agent C (organic resin particle): Dyneon TF9207Z (polytetrafluoroethylene (PTFE)) manufactured by 3M, average particle size of 120 nm, and density of 2.0 g/cm$^3$ Protrusion forming agent D: Quartron PL-10L (an aqueous dispersion sol of a silica particle; as a protrusion forming agent for preparing a protrusion forming agent liquid, a dry solid obtained by heating the aqueous dispersion sol to remove a solvent is used) manufactured by Fuso Chemical Industry Co., Ltd., average particle size of 130 nm, and density 2.2 g/cm$^3$ Protrusion forming agent E: Asahi #52 (carbon black) manufactured by Asahi Carbon Co., Ltd., average particle size of 60 nm, and density 1.8 g/cm$^3$ Ferromagnetic Powder In Table 1, "BaFe" indicates hexagonal barium ferrite powder having an average particle size (average plate diameter) of 21 nm. "SrFe1" and "SrFe2" indicate hexagonal strontium ferrite powder, and "ε-iron oxide" indicates ε-iron oxide powder.

An activation volume and an anisotropy constant Ku of various types of ferromagnetic powder described below are values obtained by the method described above using a vibrating sample magnetometer (manufactured by Toei Industry Co., Ltd.) for each ferromagnetic powder.

A mass magnetization σs is a value measured at a magnetic field intensity of 15 kOe using a vibrating sample magnetometer (manufactured by Toei Industry Co., Ltd.).

Manufacturing Method 1 of Hexagonal Strontium Ferrite Powder

"SrFe1" shown in Table 1 is hexagonal strontium ferrite powder manufactured by the following method.

1707 g of SrCO$_3$, 687 g of H$_3$BO$_3$, 1120 g of Fe$_2$O$_3$, 45 g of Al(OH)$_3$, 24 g of BaCO$_3$, 13 g of CaCO$_3$, and 235 g of Nd$_2$O$_3$ were weighed and mixed by a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a water-cooled twin roller to manufacture an amorphous body.

280 g of the manufactured amorphous body was charged into an electric furnace, was heated to 635° C. (crystallization temperature) at a heating rate of 3.5° C./min, and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be washed by repeatedly performing decantation and was dried in a heating furnace at an internal temperature of the furnace of 110° C. for 6 hours to obtain hexagonal strontium ferrite powder.

The hexagonal strontium ferrite powder ("SrFe1" in Table 1) obtained above had an average particle size of 18 nm, an activation volume of 902 nm$^3$, an anisotropy constant Ku of 2.2×10$^5$ J/m$^3$, and a mass magnetization σs of 49 A·m$^2$/kg.

12 mg of sample powder was taken from the hexagonal strontium ferrite powder obtained above, elemental analysis of the filtrated solution obtained by partially dissolving this sample powder under dissolution conditions illustrated above was performed by an ICP analyzer, and a surface layer portion content of a neodymium atom was determined.

Separately, 12 mg of sample powder was taken from the hexagonal strontium ferrite powder obtained above, elemental analysis of the filtrated solution obtained by totally dissolving this sample powder under dissolution conditions illustrated above was performed by an ICP analyzer, and a bulk content of a neodymium atom was determined.

A content (bulk content) of a neodymium atom with respect to 100 at % of an iron atom in the hexagonal strontium ferrite powder obtained above was 2.9 at %. A surface layer portion content of a neodymium atom was 8.0 at %. It was confirmed that a ratio between a surface layer portion content and a bulk content, that is, "surface layer portion content/bulk content" was 2.8, and a neodymium atom was unevenly distributed in a surface layer of a particle.

The fact that the powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M type). A crystal phase detected by X-ray diffraction analysis was a single phase of a magnetoplumbite type.

PANalytical X'Pert Pro diffractometer, PIXcel detector

Soller slit of incident beam and diffracted beam: 0.017 radians

Fixed angle of dispersion slit: ¼ degrees

Mask: 10 mm

Anti-scattering slit: ¼ degrees

Measurement mode: continuous

Measurement time per stage: 3 seconds

Measurement speed: 0.017 degrees per second

Measurement step: 0.05 degrees

Manufacturing Method 2 of Hexagonal Strontium Ferrite Powder

"SrFe2" shown in Table 1 is hexagonal strontium ferrite powder manufactured by the following method.

1725 g of SrCO3, 666 g of H3BO3, 1332 g of Fe2O3, 52 g of Al(OH)3, 34 g of CaCO3, and 141 g of BaCO3 were weighed and mixed by a mixer to obtain a raw material mixture.

The obtained raw material mixture was dissolved in a platinum crucible at a melting temperature of 1380° C., and a hot water outlet provided at a bottom of the platinum crucible was heated while stirring a melt, and the melt was discharged in a rod shape at about 6 g/sec. Hot water was rolled and quenched by a water-cooled twin roller to manufacture an amorphous body.

280 g of the obtained amorphous body was charged into an electric furnace, was heated to 645° C. (crystallization temperature), and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be washed by repeatedly performing decantation and was dried in a heating furnace at an internal temperature of the furnace of 110° C. for 6 hours to obtain hexagonal strontium ferrite powder.

The obtained hexagonal strontium ferrite powder ("SrFe2" in Table 1) had an average particle size of 19 nm, an activation volume of 1102 nm$^3$, an anisotropy constant Ku of 2.0×10$^5$ J/m$^3$, and a mass magnetization σs of 50 A·m$^2$/kg.

Manufacturing Method of ε-Iron Oxide Powder

"ε-iron oxide" shown in Table 1 is ε-iron oxide powder manufactured by the following method.

8.3 g of iron(III) nitrate nonahydrate, 1.3 g of gallium(III) nitrate octahydrate, 190 mg of cobalt(II) nitrate hexahydrate, 150 mg of titanium(IV) sulfate, and 1.5 g of polyvinylpyrrolidone (PVP) were dissolved in 90 g of pure water, and while the dissolved product was stirred using a magnetic stirrer, 4.0 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid aqueous solution obtained by dissolving 1 g of citric acid in 9 g of pure water was added to the obtained solution, and the mixture was stirred for 1 hour. The powder sedimented after stirring was collected by centrifugal separation, was washed with pure water, and was dried in a heating furnace at a furnace temperature of 80° C.

800 g of pure water was added to the dried powder, and the powder was dispersed again in water to obtain dispersion liquid. The obtained dispersion liquid was heated to a liquid temperature of 50° C., and 40 g of an aqueous ammonia solution having a concentration of 25% was dropwise added with stirring. After stirring for 1 hour while maintaining the temperature at 50° C., 14 mL of tetraethoxysilane (TEOS) was dropwise added and was stirred for 24 hours. Powder sedimented by adding 50 g of ammonium sulfate to the obtained reaction solution was collected by centrifugal separation, was washed with pure water, and was dried in a heating furnace at a furnace temperature of 80° C. for 24 hours to obtain a ferromagnetic powder precursor.

The obtained ferromagnetic powder precursor was loaded into a heating furnace at a furnace temperature of 1000° C. in an air atmosphere and was heat-treated for 4 hours.

The heat-treated ferromagnetic powder precursor was put into an aqueous solution of 4 mol/L sodium hydroxide (NaOH), and the liquid temperature was maintained at 70° C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was washed with pure water to obtain a ferromagnetic powder.

The composition of the obtained ferromagnetic powder that was checked by high-frequency inductively coupled plasma-optical emission spectrometry (ICP-OES) has Ga, Co, and a Ti substitution type ε-iron oxide (ε-Ga$_{0.28}$Co$_{0.05}$Ti$_{0.05}$Fe$_{1.62}$O$_3$). In addition, X-ray diffraction analysis is performed under the same condition as that described above for the manufacturing method 1 of hexagonal strontium ferrite powder, and from a peak of an X-ray diffraction pattern, it is checked that the obtained ferromagnetic powder does not include α-phase and γ-phase crystal structures, and has a single-phase and ε-phase crystal structure (ε-iron oxide type crystal structure).

The obtained ε-iron oxide powder ("ε-iron oxide" in Table 1) had an average particle size of 12 nm, an activation volume of 746 nm$^3$, an anisotropy constant Ku of 1.2×10$^5$ J/m$^3$, and a mass magnetization as of 16 A·m$^2$/kg.

Evaluation Method (1) Difference ($S_{0.5} - S_{13.5}$)

Using a tape spacing analyzer ((TSA) manufactured by Micro Physics)), the spacings $S_{0.5}$ and $S_{13.5}$ after n-hexane cleaning were measured by the following method, and the difference ($S_{0.5} - S_{13.5}$) from the measured values was calculated.

Five sample pieces each having a length of 5 cm were cut out from each magnetic tape of Examples and Comparative Examples, and each sample piece was subjected to n-hexane cleaning by the method described above, and then $S_{0.5}$ and $S_{13.5}$ were obtained.

In a state where a glass plate (a glass plate manufactured by Thorlabs, Inc. (model number: WG10530)) provided in TSA is disposed on the back coating layer surface of the magnetic tape (that is, the sample piece), using a urethane hemisphere provided in the TSA as a pressing member, the hemisphere was pressed against the magnetic layer surface of the magnetic tape at a pressure of 0.5 atm. In this state, white light was emitted from a stroboscope provided in the TSA to a certain area (150,000 to 200,000 μm$^2$) on the back coating layer surface of the magnetic tape through a glass plate, and the obtained reflected light was received by a charge-coupled device (CCD) through an interference filter (a filter that selectively transmits light having a wavelength of 633 nm), and thus an interference fringe image generated by an unevenness of this area was obtained.

This image was divided into 300,000 points to obtain a distance (spacing) from the surface of the glass plate on the magnetic tape side to the back coating layer surface of the magnetic tape at each point, and this was used as a histogram. Thus, a mode value of the histogram was obtained as a spacing.

The same sample piece was further pressed, and a spacing was determined by the same method as described above under a pressure of 13.5 atm.

An arithmetic average of the spacings obtained under a pressure of 0.5 atm after n-hexane cleaning for the five sample pieces is defined as a spacing $S_{0.5}$, and an arithmetic average of the spacings obtained under a pressure of 13.5 atm after n-hexane cleaning for the five sample pieces is defined as a spacing $S_{13.5}$.

(2) Dropout

The magnetic tapes of Examples and Comparative Examples are magnetic tapes obtained after being wound into a roll shape during manufacture and storage. Dropout of each magnetic tape of Examples and Comparative Examples that had been wound into a roll shape was measured as follows using a reel tester having ½ inches with a fixed head. A signal was recorded at a linear recording density of 350 kfci by using a recording head (a metal-in-gap (MIG) head, a gap length of 0.15 μm, a track width of 1.0 μm, 1.8 T), and was reproduced by a reproducing head (a giant magnetoresistive (GMR) head, an element thickness of 15 nm, a shield spacing of 0.1 μm, a track width of 1.0 μm). The unit kfci is a unit of a linear recording density (cannot be converted into SI unit system). The number of signal dropouts of a length of 0.25 μm or more in length at an output drop of 40% or more of an average output was detected, and the number per 1 m of tape length (per measurement area 1 mm² (=track width (1.0 μm)×tape length (1 m))) was adopted as dropout. From a viewpoint of reduction of an error rate, the number of dropouts is preferably 800 pieces/mm² or less.

(3) Running Stability under High Temperature and High Humidity

Each magnetic tape of Examples and Comparative Examples was stored for 6 hours in a thermo room in which the inside was kept at a temperature of 45° C. and a relative humidity of 80%, and then a position error signal (PES) was obtained in the thermo room by the following method.

For each magnetic tape of Examples and Comparative Examples, the servo pattern was read by a verify head on the servo writer used for forming the servo pattern. The verify head is a reading magnetic head that is used for confirming a quality of the servo pattern formed on the magnetic tape, and a reading element is disposed at a position corresponding to a position of the servo pattern (a position of the magnetic tape in a width direction) in the same manner as the magnetic head of a well-known magnetic recording and reproducing apparatus (drive).

A well-known PES arithmetic circuit which calculates a head positioning accuracy of a servo system as a PES from an electric signal obtained by reading the servo pattern by the verify head is connected to the verify head. The PES arithmetic circuit calculates a displacement from the input electric signal (pulse signal) in a width direction of the magnetic tape, as required, and a value obtained by applying a high pass filter (cut-off: 500 cycles/m) with respect to temporal change information (signal) of this displacement was calculated as a PES. A PES can be used as an index of running stability, and the smaller the value of PES, the more excellent running stability can be evaluated.

The above results are shown in Table 1.

TABLE 1

| | | Back coating layer | | | | | | | | |
|---|---|---|---|---|---|---|---|---|---|---|
| | Ferromagnetic powder | α-iron oxide (parts by mass) | Carbon black (parts by mass) | Protrusion forming agent | Organic compound | $S_{0.5}$ (nm) | $S_{13.5}$ (nm) | $S_{0.5} - S_{13.5}$ (nm) | Dropout (pieces/mm²) | PES (nm) |
| Example 1 | BaFe | 60.0 | 40.0 | Protrusion forming agent A | Tridecylamine | 48 | 25 | 23 | 450 | 8 |
| Example 2 | BaFe | 60.0 | 40.0 | Protrusion forming agent B | | 42 | 28 | 14 | 680 | 12 |
| Example 3 | BaFe | 60.0 | 40.0 | Protrusion forming agent C | | 45 | 33 | 12 | 770 | 9 |
| Example 4 | BaFe | 40.0 | 60.0 | Protrusion forming agent A | | 59 | 30 | 29 | 650 | 6 |
| Example 5 | BaFe | 0 | 100.0 | Protrusion forming agent A | | 80 | 35 | 45 | 740 | 4 |
| Example 6 | BaFe | 80.0 | 20.0 | Protrusion forming agent A | | 28 | 16 | 12 | 350 | 16 |
| Example 7 | BaFe | 60.0 | 40.0 | Protrusion forming agent A | Trioctylamine | 47 | 26 | 21 | 470 | 7 |
| Example 8 | BaFe | 60.0 | 40.0 | Protrusion forming agent A | Octylphosphonic acid | 49 | 30 | 19 | 520 | 8 |
| Example 9 | SrFe1 | 60.0 | 40.0 | Protrusion forming agent A | Tridecylamine | 47 | 28 | 19 | 460 | 6 |
| Example 10 | SrFe2 | 60.0 | 40.0 | Protrusion forming agent A | | 48 | 30 | 18 | 520 | 7 |
| Example 11 | ε-iron oxide | 60.0 | 40.0 | Protrusion forming agent A | | 46 | 28 | 18 | 490 | 9 |
| Comparative Example 1 | BaFe | 60.0 | 40.0 | None | None | 39 | 33 | 6 | 1230 | 32 |
| Comparative Example 2 | BaFe | 60.0 | 40.0 | Protrusion forming agent D | Tridecylamine | 46 | 40 | 6 | 1180 | 10 |
| Comparative Example 3 | BaFe | 60.0 | 40.0 | Protrusion forming agent D | None | 44 | 39 | 5 | 1890 | 13 |
| Comparative Example 4 | BaFe | 60.0 | 40.0 | Protrusion forming agent E | | 46 | 39 | 7 | 2100 | 10 |
| Comparative Example 5 | BaFe | 60.0 | 40.0 | Protrusion forming agent A | | 42 | 34 | 8 | 890 | 18 |
| Comparative Example 6 | BaFe | 0 | 100.0 | Protrusion forming agent A | | 78 | 68 | 10 | 1450 | 8 |
| Comparative Example 7 | BaFe | 80.0 | 20.0 | Protrusion forming agent A | | 25 | 21 | 4 | 1030 | 29 |
| Comparative Example 8 | BaFe | 60.0 | 40.0 | Protrusion forming agent B | | 43 | 36 | 7 | 1090 | 25 |
| Comparative Example 9 | BaFe | 60.0 | 40.0 | Protrusion forming agent C | | 44 | 38 | 6 | 1250 | 22 |

From the results shown in Table 1, it can be confirmed that in the magnetic tape of Examples, occurrence of dropout is more suppressed than in the magnetic tape of Comparative Examples.

An aspect of the present invention is effective in a technical field of magnetic recording media for various data storages.

What is claimed is:

1. A magnetic recording medium comprising:
   a non-magnetic support;
   a magnetic layer that includes ferromagnetic powder on one surface side of the non-magnetic support; and a back coating layer that includes non-magnetic powder on the other surface side of the non-magnetic support, wherein a difference $S_{0.5}$–$S_{13.5}$ between a spacing $S_{0.5}$ measured on a surface of the back coating layer by optical interferometry under a pressure of 0.5 atm after n-hexane cleaning and a spacing $S_{13.5}$ measured on the surface of the back coating layer by optical interferometry under a pressure of 13.5 atm after n-hexane cleaning is 12 nm or more.

2. The magnetic recording medium according to claim 1, wherein the difference is 12 nm or more and 50 nm or less.

3. The magnetic recording medium according to claim 1, wherein the difference is 12 nm or more and 40 nm or less.

4. The magnetic recording medium according to claim 1, wherein the spacing $S_{0.5}$ is 20 nm or more and 90 nm or less.

5. The magnetic recording medium according to claim 1, wherein the spacing $S_{13.5}$ is 15 nm or more and 40 nm or less.

6. The magnetic recording medium according to claim 1, wherein the spacing $S_{13.5}$ is 15 nm or more and 29 nm or less.

7. The magnetic recording medium according to claim 1, wherein the back coating layer includes an organic resin particle.

8. The magnetic recording medium according to claim 1, wherein the back coating layer includes a compound containing an alkyl group having 5 or more carbon atoms.

9. The magnetic recording medium according to claim 8, wherein the compound is an organic amine compound.

10. The magnetic recording medium according to claim 8, wherein the compound is an organic phosphorus compound.

11. The magnetic recording medium according to claim 1, wherein the back coating layer has a thickness of 0.5 μm or less.

12. The magnetic recording medium according to claim 1, further comprising:

a non-magnetic layer including non-magnetic powder between the non-magnetic support and the magnetic layer.

13. The magnetic recording medium according to claim 1, wherein the magnetic recording medium is a magnetic tape.

14. A magnetic recording and reproducing apparatus comprising:

a magnetic recording medium; and a magnetic head, wherein the magnetic recording medium is a magnetic recording medium comprising:

a non-magnetic support;

a magnetic layer that includes ferromagnetic powder on one surface side of the non-magnetic support; and a back coating layer that includes non-magnetic powder on the other surface side of the non-magnetic support, wherein a difference $S_{0.5}$–$S_{13.5}$ between a spacing $S_{0.5}$ measured on a surface of the back coating layer by optical interferometry under a pressure of 0.5 atm after n-hexane cleaning and a spacing $S_{13.5}$ measured on the surface of the back coating layer by optical interferometry under a pressure of 13.5 atm after n-hexane cleaning is 12 nm or more.

15. The magnetic recording and reproducing apparatus according to claim 14, wherein the difference is 12 nm or more and 50 nm or less.

16. The magnetic recording and reproducing apparatus according to claim 14, wherein the difference is 12 nm or more and 40 nm or less.

17. The magnetic recording and reproducing apparatus according to claim 14, wherein the spacing $S_{0.5}$ is 20 nm or more and 90 nm or less.

18. The magnetic recording and reproducing apparatus according to claim 14, wherein the spacing $S_{13.5}$ is 15 nm or more and 40 nm or less.

19. The magnetic recording and reproducing apparatus according to claim 14, wherein the spacing $S_{13.5}$ is 15 nm or more and 29 nm or less.

* * * * *